Patented May 21, 1929.

1,713,565

UNITED STATES PATENT OFFICE.

BERTHOLD STEIN, WILLY TRAUTNER, AND ROBERT BERLINER, OF ELBERFELD, GERMANY, ASSIGNORS TO GRASSELLI DYESTUFF CORPORATION, OF NEW YORK, N. Y., A CORPORATION OF DELAWARE.

PROCESS OF MAKING BENZANTHRONE COMPOUNDS.

No Drawing. Application filed September 16, 1926, Serial No. 135,988, and in Germany October 8, 1925.

Our invention relates to a novel process of making benzanthrone and substituted benzanthrone compounds.

We have shown in our co-pending application Serial No. 135,984 filed on even date that cinnamic aldehyde compounds condense in nonalkaline mediums with anthrone compounds to cinnamylidene anthrones which most probably have the general formula:

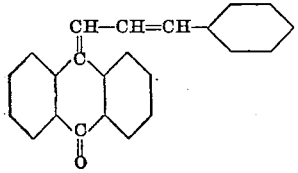

We have now found that in submitting such cinnamylidene anthrones to the action of anhydrous aluminium chloride, preferably in presence of an alkali metal chloride, a peculiar reaction takes place by which a benzanthrone compound is obtained with elimination of the phenyl group.

This reaction is particularly valuable to produce benzanthrone itself, which is obtained easily with a purity sufficient for technical uses and with technically excellent yields. Substituted cinnamylidene-anthrones as obtained from substituted anthrones and cinnamic aldehydes condense likewise through the action of aluminium chloride to the corresponding benzanthrones, but the yields in those cases are usually not as good as those obtained from the unsubstituted compounds.

The following examples will further illustrate our invention, the parts being by weight. We wish it understood, however, that our invention is not limited to the particular ingredients or proportions and reacting conditions mentioned therein, it is for instance possible to vary the amount of condensing agent in wide proportions without departing from the spirit of our invention.

*Example 1.*—A mixture of 4 parts anhydrous aluminium chloride and 1 part sodium chloride is melted and at a temperature of about 100–105° C. 1 part cinnamylidene-anthrone added whilst stirring. The melt turns immediately red. The melt, after it does not show any more the presence of unreacted cinnamylidene-anthrone, is poured into hydrochloric acid and a yellowish-brown crystalline compound separates, which is filtered off, washed to neutrality and dried. It is crude benzanthrone. The melting points of products obtained in this manner have been found as high as 163° C. with yields of 60–70% of theory. A single recrystallization from glacial acetic acid brings the melting point of this benzanthrone to 169° C.

*Example 2.*—40 parts anhydrous aluminium chloride and 10 parts sodium chloride are melted together and at a temperature of about 100° C. 10 parts cinnamylidene-alpha-chloranthrone added slowly, keeping the temperature carefully below 105° C. The condensation is instantaneous and a sample of the reaction product will now dissolve in concentrated sulfuric acid with a yellowish-orange color, instead of the bluish-green color of a solution of the parent material in concentrated sulfuric acid. The thick, dough like melt is now poured into ice cold diluted hydrochloric acid; a yellow, somewhat tarry precipitate separates. It is filtered off and washed to neutrality. It is purified by repeated crystallization or sublimation, and is then obtained with a yield of about 10% of theory as a yellow crystalline compound. It resembles benzanthrone in its reactions and the colors of its solutions, but it contains chlorine. It is probably a chloro-benzanthrone.

*Example 3.*—20 parts anhydrous aluminium chloride and 5 parts sodium chloride are melted at about 125° C. and after cooling to about 100–105° C. 5 parts cinnamylidene-beta-chlor-anthrone are added to the homogeneous melt. The melt is, after a sample of the reaction product dissolves in concentrated sulfuric acid with an orange-yellow color, poured on ice to which a little hydrochloric acid has been added. A yellowish-brown precipitate separates which is filtered off and purified by crystallization. Yellow crystals are so obtained with a yield of about 10% of theory. They dissolve in concentrated sulfuric acid with a yellowish-orange color. They represent a beta-chloro-benzanthrone. The correct position of the chlorine atom is however unknown.

We claim:

1. In processes of producing benzanthrone compounds the step consisting in submitting cinnamylidene-anthrone compounds to the action of anhydrous aluminium chloride.

2. In processes of producing benzanthrone compounds the step consisting in heating cinnamylidene-anthrone compounds with a mixture of anhydrous aluminium chloride and an alkali metal chloride.

3. The processes of producing benzanthrone compounds which consists in heating to about 100° C. a cinnamylidene-anthrone compound in a melt of anhydrous aluminium chloride and sodium chloride.

4. In processes of producing benzanthrone the step consisting in submitting cinnamylidene-anthrone to the action of anhydrous aluminium chloride.

5. In processes of producing benzanthrone the step consisting in heating cinnamylidene-anthrone with a mixture of anhydrous aluminium chloride and an alkali metal chloride.

6. The process of producing benzanthrone which consists in heating to about 100° C. ciannamylidene-anthrone in a melt of anhydrous aluminium chloride and sodium chloride.

In testimony whereof, we have hereunto set our hands.

BERTHOLD STEIN.
WILLY TRAUTNER.
ROBERT BERLINER.